United States Patent [19]
Marini

[11] 3,781,653
[45] Dec. 25, 1973

[54] STABILIZED DIRECT-CURRENT CONVERTER RESPONSIVE TO OFF-PERIOD CURRENT

[75] Inventor: Roberto Marini, Milan, Italy

[73] Assignee: Societe Italiana Telecomunicazioni Siemens S.p.A., Milan, Italy

[22] Filed: Mar. 16, 1972

[21] Appl. No.: 235,150

[30] Foreign Application Priority Data
Mar. 18, 1971 Italy .............................. 21945 A/71

[52] U.S. Cl. ..................... 323/17, 321/2, 323/20, 323/22 T, 323/DIG. 1
[51] Int. Cl. ............................................. G05f 1/56
[58] Field of Search ................. 321/2; 323/20, 22 T, 323/17, DIG. 1

[56] References Cited
UNITED STATES PATENTS

| 3,473,049 | 10/1969 | Alexander | 323/DIG. 1 |
| 3,600,666 | 8/1971 | Gliever | 323/DIG. 1 |
| 3,373,330 | 3/1968 | O'Brien | 323/20 UX |
| 3,657,572 | 4/1972 | Millman | 323/DIG. 1 |

Primary Examiner—A. D. Pellinen
Attorney—Karl F. Ross

[57] ABSTRACT

A stabilized d-c output is derived from a d-c input voltage through a stepdown circuit including a chopping transistor which is periodically blocked and unblocked by a pulse train from a trigger stage and, when conducting, charges a storage capacitor through a series inductance; with the chopping transistor cut off, the inductance continues the charging of the capacitor through a diode in series with a current sensor. The latter, together with a voltage sensor connected across the capacitor, controls the width of the pulses from the trigger stage to hold the voltage or current level substantially constant. An ancillary transistor is turned on by the trigger pulses to apply to the chopping transistor a reverse bias accelerating the sweep-out of its minority carriers.

9 Claims, 5 Drawing Figures

STABILIZED DIRECT-CURRENT CONVERTER RESPONSIVE TO OFF-PERIOD CURRENT

My present invention relates to a circuit arrangement for generating a stabilized d-c voltage or current by stepping down a higher supply voltage with the aid of a periodically operating electronic switch hereinafter referred to as a chopping transistor.

In U.S. Pat. Nos. 3,594,499, 3,629,497 and 3,641,267, for example, there has been disclosed such a direct-current converter as used to supply a relatively low operating voltage to various stages of a television receiver, the chopping transistor being triggered by a fly-back pulse generated in the sweep-control circuit for a horizontal deflection yoke. The low-voltage output current is smoothed by a reactive circuit including a series inductance, more specifically the primary of a feedback transformer, and a shunt capacitance; in the non-conductive stage of the transistor between trigger pulses, the flow of a charging current into the capacitor is maintained through a diode in a rectifying branch of the sweep circuit.

An object of my present invention is to provide improved means for stabilizing one of the parameters of the output current of a system of this general type, i.e. its amperage or its voltage, or a combination thereof according to a so-called fold-back characteristic.

Another object of my invention is to provide means for enhancing the efficiency of such a current converter by accelerating the transition from the conductive to the non-conductive state of the chopping transistor upon the termination of any of the trigger pulses.

In accordance with an important feature of my invention, stabilization of the output current generated by a current converter of this character is achieved by inserting a current sensor in the rectifying branch of the reactive network beyond the chopping transistor, this sensor thus responding to current flowing in the open state of the electronic switch constituted by that transistor. Consequently, the flow of a charging current passing into the storage capacitor during periods of switch closure, i.e. in the conductive phase of the chopping transistor, is unaffected by the presence of this current sensor and is determined only by the width of the trigger pulses which periodically block and unblock the chopping transistor. The generator of these trigger pulses, in turn, responds to the output of the current sensor to alter the pulse width in a manner tending to maintain the output current at a predetermined value.

The same control circuit may also respond to a signal from a conventional voltage sensor, connected across the output terminals, in order to maintain the output voltage substantially constant. Advantageously, the monitoring signals from the two sensors are applied to the control input of the trigger-pulse generator through respective diodes so poled that the larger of the two signals determines the switching rate of the chopper, thereby preventing excessive rises in either the output current or the output voltage due to significant changes in load resistance and/or supply voltage. It is also possible, pursuant to a more particular feature of my invention, to extend a biasing connection from the output terminals of the system to the current sensor, specifically to a base/emitter circuit of a monitoring transistor forming part of that sensor, in order to establish the aforementioned fold-back characteristic along which both the current and the voltage rise at substantially constant rates.

The forward emitter/base voltage of the monitoring transistor may be utilized as an operating threshold for the current sensor which in that case includes a resistance in the rectifying branch of the smoothing circuit to develop a voltage drop proportional to the reactive off-period current flow, the current surges due to the difference between this voltage drop and the aforementioned threshold being integrated in the collector circuit of the monitoring transistor to furnish the control signal.

According to another feature of my invention, the chopping transistor is provided with a sweep-out circuit including an ancillary transistor which applies a reverse bias to the base of the chopping transistor in the absence of a trigger pulse, thereby accelerating the cut-off of the chopping transistor upon the termination of any trigger pulse. A supplemental energizing circuit for this ancillary transistor may include a feedback coil electromagnetically coupled to the series inductance of the smoothing network.

The above and other features of the present invention will become apparent from the following description given with reference to the accompanying drawing in which.

Figure 1:
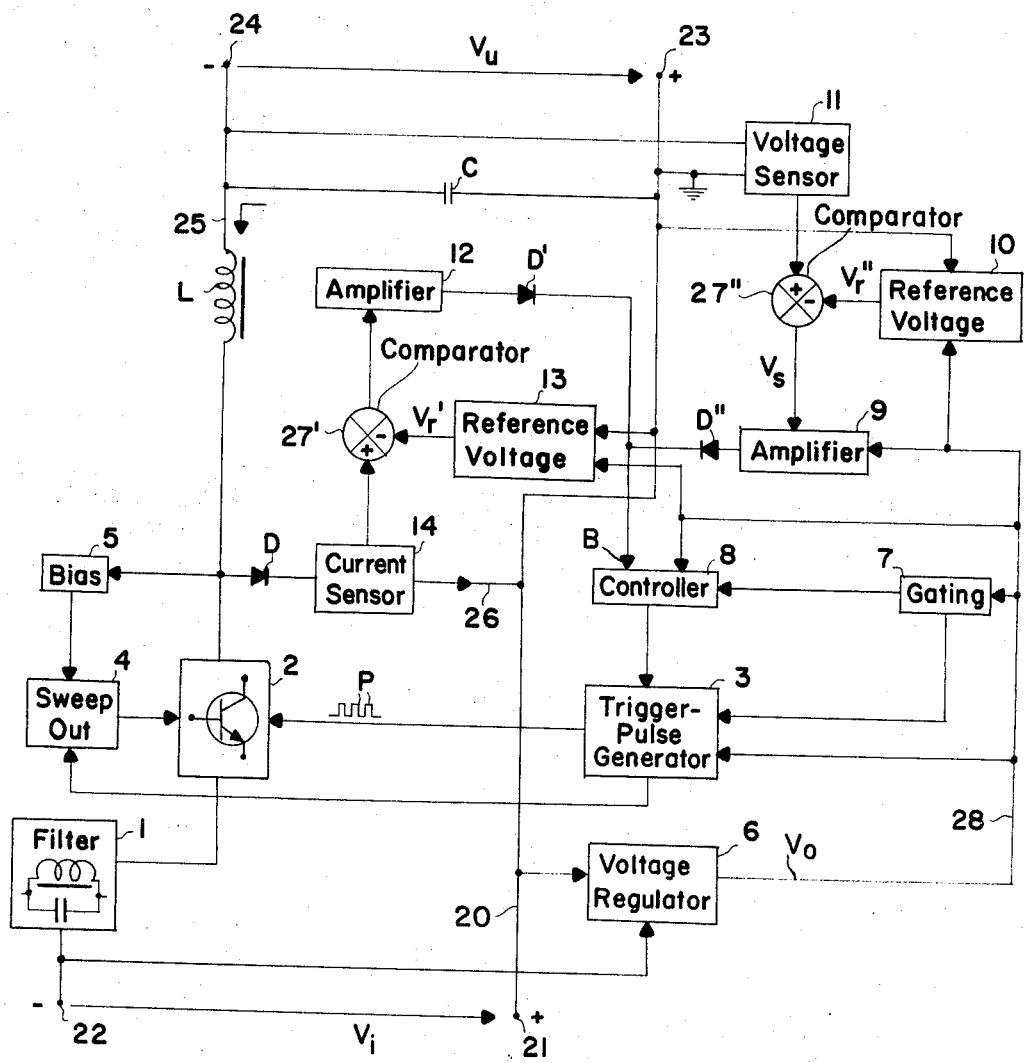
FIG. 1 is a block diagram of a current converter embodying my invention.

The system illustrated in FIG. 1 comprises a positive bus bar 20, which may be grounded as shown, extending between an input terminal 21 and an output terminal 23; a negative input terminal 22 is connected to a corresponding output terminal 24 by way of a low-pass filter 1, an electronic switch 2 and a series inductance L inserted in a bus bar 25. Inductance L forms part of a smoothing network also including a shunt capacitance C connected across conductors 20 and 25. Input terminals 21 and 22 are energized, from a source not shown, with a d-c voltage $V_i$ (e.g. on the order of 220 V) which is stepped down by the periodically closed and opened electronic switch 2 and the smoothing network L, C into a considerably reduced output voltage $V_u$ (e.g. on the order of 30 V) appearing between terminals 23 and 24.

Input voltage $V_i$ is also applied to an auxiliary voltage regulator 6 of conventional design supplying a stabilized operating voltage $V_o$ via an ancillary bus bar 28 to a number of components described hereinafter; voltage $V_o$ is independent of the magnitude of any load resistance connected across output terminals 23, 24. The components energized from voltage regulator 6 include a generator 3 of trigger pulses P serving for the periodic closure of switch 2; generator 3 may comprise a flip-flop which receives setting pulses from a control circuit 8 and which is periodically reset by synchronizing pulses from a gating circuit 7 also working into controller 8. The latter may be a sawtooth generator tripped by the synchronizing pulses from circuit 7 and effective to set the flip flop of generator 3 whenever its rising voltage reaches the voltage level of a monitoring signal $V_s$ delivered by a pair of diodes D' and D'' to an input B thereof. Thus, the potential of point B determines the spacing of a setting and a resetting pulse within the invariable pulse cycle of gating circuit 7, this spacing corresponding to the width of the trigger pulses P transmitted from generator 3 to switch 2; the higher the voltage $V_s$, the shorter are the trigger pulses with corresponding reduction in the cumulative value of the charges stored on capacitor C.

Diode D' forms part of a monitoring loop comprising a current sensor 14 which lies in a rectifying branch 26 of the smoothing circuit including the reactances L and C, this branch containing a diode D so poled as to maintain the flow of charging current (here negative) into capacitor C through the flywheel effect of inductance L during off-periods, i.e. when the switch 2 is open. Current sensor 14 works into a comparator 27' which receives a reference voltage $V_r'$ from a supply network 13 such as a voltage divider energized by regulator 6. Comparator 27' supplies the diode D', through an amplifier 12, with the integrated difference between the output voltage of sensor 14 and the reference voltage $V_r'$.

In an analogous manner, a voltage sensor 11 connected across conductors 20 and 25 works into a comparator 27'' receiving a reference voltage $V_r''$ from a supply network 10 and feeding the diode D'' through an amplifier 9. Since the output voltage $V_u$ detected by sensor 11 is substantially constant, no integrator is necessary in the voltage-sensing loop.

Generator 3 also controls a sweep-out circuit 4 which lies in cascade with a biasing circuit 5 for the electronic switch 2 as more fully described hereinafter with reference to FIGS. 2a and 2b. Circuit 4 is designed to enhance the efficiency of the system by minimizing the time required for the opening of the electronic switch 2 on the trailing edge of a trigger pulse P.

Figure 2A:
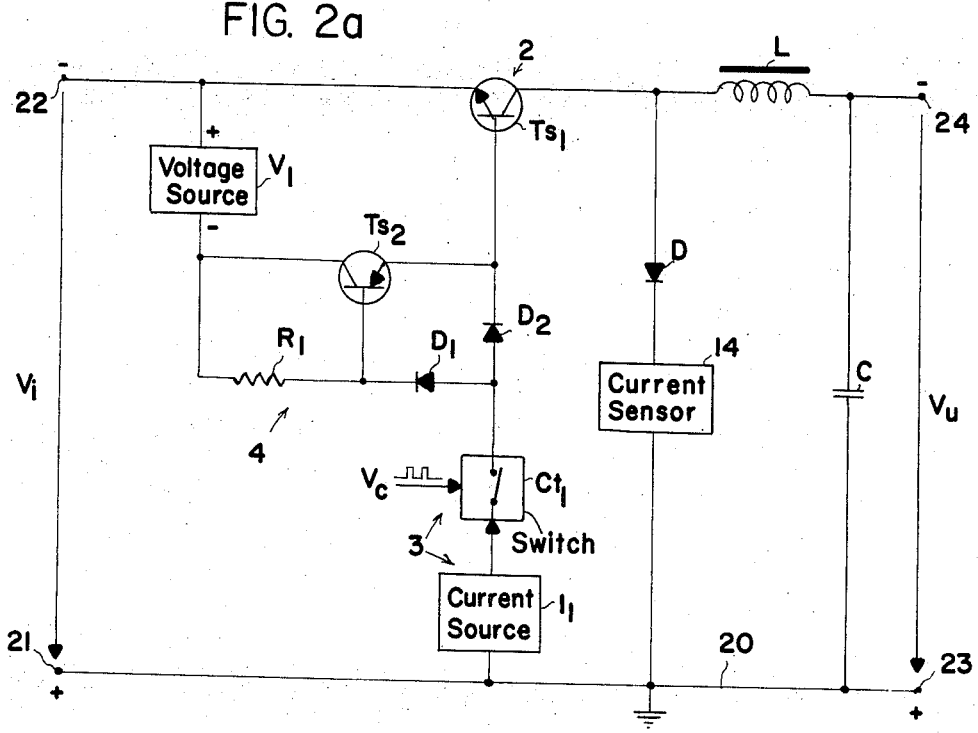
FIG. 2a is a more detailed circuit diagram of an electronic switch forming part of the system shown in FIG. 1.

Details of the electronic switch 2 and its sweep-out circuit 4 are seen in FIG. 2a which shows that switch as an NPN transistor $Ts_1$ having its emitter tied to negative input terminal 22 and its collector connected through coil L to the corresponding output terminal 24. The base of transistor $Ts_1$ is normally biased negative by a supplemental voltage source $V_1$ through an ancillary transistor $Ts_2$ of the opposite conductivity type (PNP). A resistor $R_1$ between the base and the collector of transistor $Ts_2$ maintains this transistor saturated in the absence of an overriding trigger pulse P from generator 3 which has been schematically illustrated as a current source $I_1$ in series with a switch $Ct_1$ controlled by a rectangular gating signal $V_c$. It will be understood that this gating signal is constituted by the setting and resetting pulses transmitted to generator 3 by the circuits 8 and 7 of FIG. 1. Upon closure of switch $Ct_1$, positive biasing current flows into a pair of diodes $D_1$ and $D_2$ to cut off the transistor $Ts_2$ and to saturate the transistor $Ts_1$ which thereupon passes a negative charging current to capacitor C by way of coil L. When the trigger pulse disappears, transistor $Ts_2$ immediately conducts and drains the minority charge carriers (holes) from the base of transistor $Ts_1$ with instant stopping of current flow through the latter transistor. Charging current, however, continues to load the capacitor via diode D in series with sensor 14 which, therefore, detects that off-period current flow and signals its magnitude to control circuit 8 (FIG. 1).

Figure 2B:
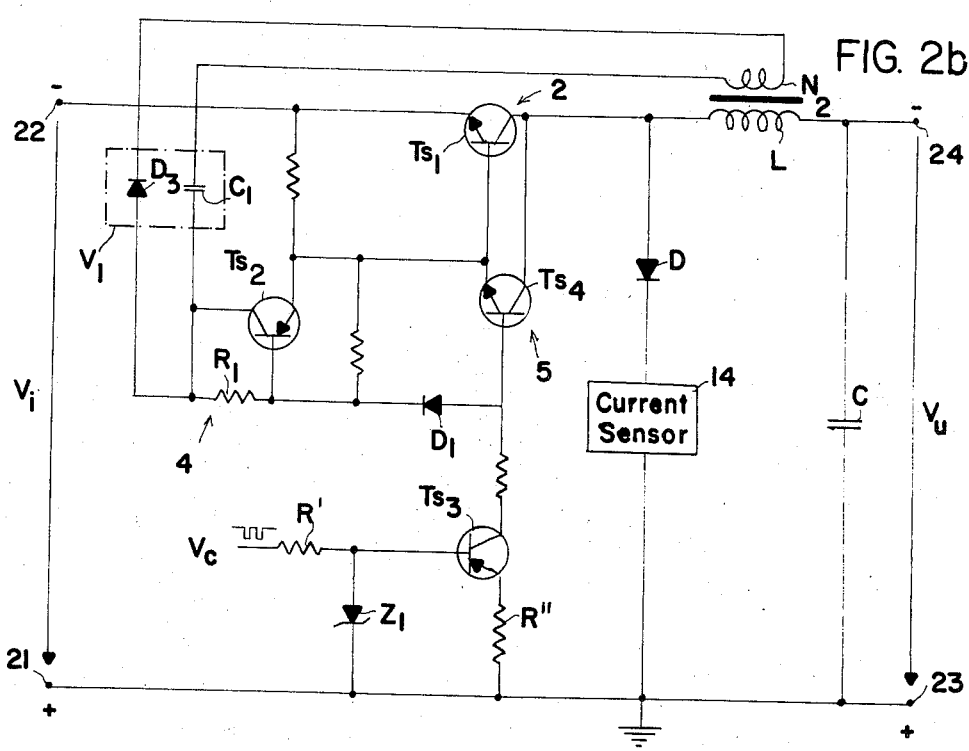
FIG. 2b is a similar diagram, illustrating a modification.

FIG. 2b shows a more elaborate circuit arrangement wherein a PNP transistor $Ts_3$ has been substituted for switch $Ct_1$ whereas the diode $D_2$ has been replaced by a further NPN transistor $Ts_4$ in cascade with switching transistor $Ts_1$ and in tandem with ancillary transistor $Ts_2$ as a part of the biasing circuit 5 of FIG. 1. Voltage source $V_1$ has now been illustrated as a condenser $C_1$ and a diode $D_3$ serially connected across a secondary winding $N_2$ of a transformer whose primary winding is the coil L. Condenser $C_1$ thus acquires a negative charge which biases the bases of transistors $Ts_1$ (through transistor $Ts_4$) and $Ts_2$ in the aforedescribed manner.

The gating pulses $V_c$ applied to the base of trigger transistor $Ts_3$ pass through a pair of resistors R' and R'' in the base/emitter path of this transistor, the base being connected to ground through a Zener diode $Z_1$ serving as a protection against overvoltage.

Figure 3:
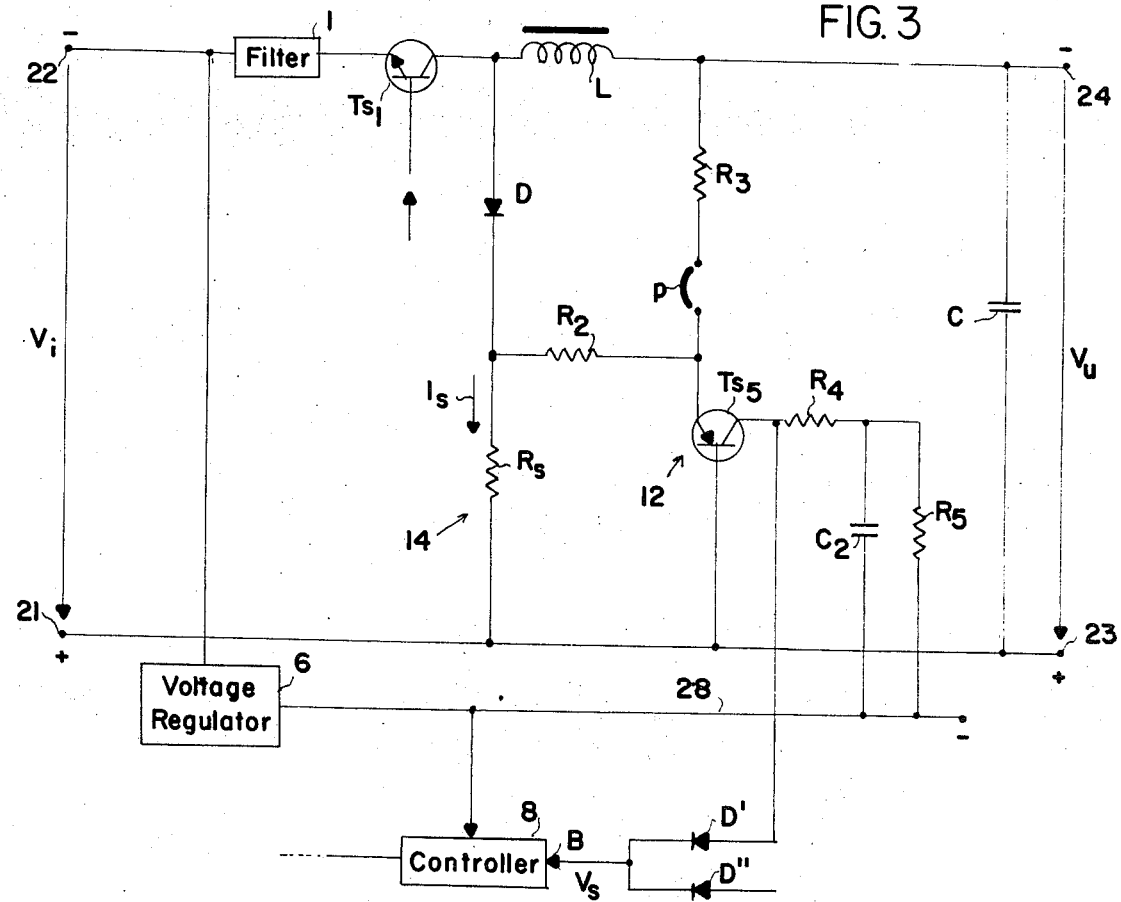
FIG. 3 is a more detailed circuit diagram of a current sensor shown in FIG. 1.

In FIG. 3, where the circuits 3 – 5 in the input of switching transistor $Ts_1$ have been omitted, current sensor 14 is illustrated as including a PNP transistor $Ts_5$ acting both as a threshold device and as an amplifier, thus fulfilling the functions of circuits 12 and 27' in FIG. 1. The emitter of transistor $Ts_5$ is connected through a resistor $R_2$ to the junction of diode D with a series resistor $R_s$ traversed by the charging pulses that flow in the nonconductive state of switching transistor $Ts_1$. As long as the voltage drop across resistor $R_s$ does not exceed the breakdown potential of the emitter/base path in the forward direction (the drop across resistor $R_2$ being negligible under these circumstances), i.e. with transistor $Ts_1$ conducting, transistor $Ts_5$ is cut off so that its collector is at a high negative potential. Promptly upon the termination of a trigger pulse, however, the current flow through diode D unblocks the transistor $Ts_5$ and builds up a positive charge on a capacitor $C_2$ which, together with a shunting resistor $R_5$, forms part of an integrating network serially connected with a resistor $R_4$ in the collector lead of this transistor. Thus, the cumulative charge of integrating capacitor $C_2$ is proportional to the average current flow through diode D which in turn is related to the output current drawn by the load connected across terminals 23, 24. The potential of capacitor $C_2$ is transmitted through resistor $R_4$ and diode D' to the monitoring input B of controller 8 as a sensing signal $V_s$, overriding a similar signal from diode D'' if the output voltage $V_u$ is relatively low. If the output voltage is high and the current is low, as for example in the case of an open-circuited load, the signal voltage from diode D'' predominates.

Figure 4:
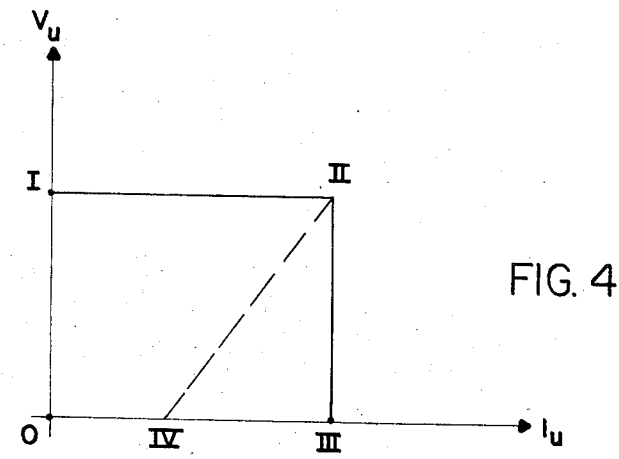
FIG. 4 is a graph illustrating the relationship between output voltage and output current in the converter of FIG. 1.

In FIG. 3 I have also shown a clip p which can be inserted to connect the emitter of transistor $Ts_5$ to the negative output terminal 24 via a resistor $R_3$ for modifying the bias of this transistor so as to change the output characteristic of the system. This will be best understood from the graph of FIG. 4 where output voltage $V_u$ has been plotted against output current $I_u$. A point I on the ordinate axis represents the open-circuit condition whereas a point III on the abscissa designates a short circuit. A horizontal line I – II therefore indicates voltage regulation through diode D'' whereas a vertical line II – III designates current regulation through diode D'. With clip p inserted, an increase in the load resistance and/or a reduction in the supply voltage causes a simultaneous reduction in output current and voltage along a sloping line I – IV whose low-voltage point IV lies approximately midway between point III and the origin O; this is conventionally referred to as a foldback characteristic.

The system described and illustrated is relatively simple to realize since one of the terminals of current sensor 14 is directly grounded at bus bar 20; this sensor operates only during a fraction of a chopping cycle so that its power consumption is small. Moreover, the sensor 14 and the controlled switch 2 are connected to the supply circuit ahead of the reactive network L, C so as to avoid the introduction of spurious phase shifts therebetween and to enhance the stability of the system; with this arrangement, furthermore, the initial charging current flowing into capacitor C at the beginning of operations is already subjected to the regulating action of controller 8 so that the risk of overcharging is eliminated.

In a prototype representing a practical realization of such a current converter, an efficiency of 75 to 92 percent was obtained with output voltages ranging between 5 and 48V and output currents up to about 20 amps; with a power output of about 200 W (e.g. 5.5 amps at 36 V), the volumetric ratio between the converter structure (exclusive of cooling fins) and the delivered power was on the order of 3 cm$^3$/W.

I claim:

1. A stabilized direct-current converter comprising: a pair of input terminals connected across a source of direct current; a pair of output terminals connected to said input terminals for energization thereby; switch means serially connected between said input and output terminals; control means for periodically opening and closing said switch means, thereby generating an intermittent current flow between said input and output terminals; a reactive network between said switch means and said output terminals for smoothing said current flow, said metwork including a rectifying branch carrying an off-period current in the open state of said switch means; current-sensing means in said branch connected to said control means for varying the periods of closure of said switch means in response to the magnitude of said off-period current to maintain the current flow smoothed by said network substantially at a predetermined value, said current-sensing means including a resistance in said branch, a threshold stage connected across said resistance and integrating circuitry energizable by said threshold means in response to a voltage drop across said resistance exceeding a predetermined minimum, said integrating circuitry generating an input signal for said control means, said threshold stage including a monitoring transistor with an emitter-base circuit connected across said resistance; and a biasing circuit extending from said output terminals to said emitter/base circuit for modifying the operation of said monitoring transistor in response to variations in output voltage.

2. A current converter as defined in claim 1, further comprising voltage-sensing means connected across said output terminals and coupled to said control means for delivering thereto another input signal for maintaining a substantially constant output voltage.

3. A current converter as defined in claim 2 wherein said current-sensing means and said voltage-sensing means are connected to said control means through a pair of diodes.

4. A current converter as defined in claim 1 wherein said switch means comprises a chopping transistor with a base and an emitter, said control means including a generator of trigger pulses connected to said base.

5. A current converter as defined in claim 4 wherein said chopping transistor is provided with biasing means connected across said base and emitter for blocking conduction in the absence of said trigger pulses, said biasing means including an ancillary transistor provided with a supplemental energizing circuit and connected to apply a reverse bias to the base of said chopping transistor in the absence of a trigger pulse from said generator.

6. A current converter as defined in claim 5 wherein said reactive network includes a series inductance, said supplemental energizing circuit including a feedback coil electromagnetically coupled to said series inductance.

7. A current converter as defined in claim 5 wherein said biasing means includes a further transistor in cascade with said chopping transistor and in tandem with said ancillary transistor, said generator being connected to said further transistor for transmitting said trigger pulses through the latter to the base of said chopping transistor.

8. A stabilized direct-current converter comprising: a pair of input terminals connected across a source of direct current; a pair of output terminals connected to said input terminals for energization thereby; switch means serially connected between said input and output terminals, said switch means including a chopping transistor with a base and an emitter; control means for periodically opening and closing said switch means, thereby generating an intermittent current flow between said input and output terminals, said control means including a generator of trigger pulses connected to said base; a reactive network between said switch means and said output terminals for smoothing said current flow, said network including a rectifying branch carrying an off-period current in the open state of said switch means; current-sensing means in said branch connected to said control means for varying the periods of closure of said switch means in response to the magnitude of said off-period current to maintain the current flow smoothed by said network substantially at a predetermined value; and biasing means connected across said base and emitter for blocking conduction of said chopping transistor in the absence of said trigger pulses; said biasing means including an ancillary transistor provided with a supplemental energizing circuit and connected to apply a reverse bias to the base of said chopping transistor in the absence of a trigger pulse from said generator, and a further transistor in cascade with said chopping transistor and in tandem with said ancillary transistor, said generator being connected to said further transistor for transmitting said trigger pulses through the latter to the base of said chopping transistor.

9. A current converter as defined in claim 8 wherein the conductor type of said further transistor is the same as that of said chopping transistor but opposite that of said ancillary transistor, said further transistor and ancillary transistor having interconnected emitters joined to the base of said chopping transistor.

* * * * *